US007769726B2

(12) United States Patent
Gitai et al.

(10) Patent No.: US 7,769,726 B2
(45) Date of Patent: Aug. 3, 2010

(54) METHOD FOR VERIFICATION OF DATA AND METADATA IN A DATA REPOSITORY

(75) Inventors: Asaf Gitai, Haifa (IL); Ronen Cohen, Gesher Haziv (IL); Eyal Mush, Qiryat-Motzkin (IL); Uri Haham, Karkhr (IL)

(73) Assignee: SAP, AG, Walldorf (DE)

( * ) Notice: Subject to any disclaimer, the term of this patent is extended or adjusted under 35 U.S.C. 154(b) by 360 days.

(21) Appl. No.: 11/967,709

(22) Filed: Dec. 31, 2007

(65) Prior Publication Data

US 2009/0171991 A1 Jul. 2, 2009

(51) Int. Cl.
*G06F 17/30* (2006.01)

(52) U.S. Cl. .................................... 707/688
(58) Field of Classification Search ............... 707/2, 707/3, 100, 688; 711/119
See application file for complete search history.

(56) References Cited

U.S. PATENT DOCUMENTS

| 6,567,798 | B1* | 5/2003 | Hollberg et al. ............... 707/2 |
| 7,343,377 | B1* | 3/2008 | van Opdorp ................ 707/100 |
| 2002/0103973 | A1* | 8/2002 | Zimniewicz et al. ........ 711/119 |
| 2004/0054679 | A1* | 3/2004 | Ralston ...................... 707/100 |
| 2004/0122646 | A1* | 6/2004 | Colossi et al. ................ 703/22 |
| 2006/0106847 | A1* | 5/2006 | Eckardt et al. ............. 707/101 |
| 2007/0038610 | A1* | 2/2007 | Omoigui ........................ 707/3 |
| 2008/0052297 | A1* | 2/2008 | LeClair ..................... 707/100 |

* cited by examiner

*Primary Examiner*—Etienne P LeRoux
(74) *Attorney, Agent, or Firm*—Cotman IP Law Group, PLC (57) ABSTRACT

A method for metadata verification of a data repository of a computer system is described comprising accessing a data repository through a data profiler program, querying the data repository for metadata information about the data repository, presenting statistics regarding the metadata information using the profiler, analyzing the metadata information to identify suspect metadata information from the data repository and presenting the suspect metadata information for inspection using the profiler.

20 Claims, 8 Drawing Sheets

100

| | |
|---|---|
| CARLSBAD | 1 |
| California | 5 |
| CAROL STREAM | 4 |
| Illinois | 10 |
| CARROLLTON | 2 |
| Texas | 12 |
| CARY | 3 |
| Illinois | 1 |
| North Carolina | 16 |
| CHAMBLEE | 1 |
| Georgia | 1 |
| CHARLESTON | 1 |
| West Virginia | 2 |
| CHARLOTTE | 12 |
| North Carolina | 27 |
| CHEVY CHASE | 1 |
| Maryland | 1 |
| CHEYENNE | 1 |
| Wyoming | 2 |
| CHICAGO | 37 |
| Illinois | 85 |
| City | 4 |
| Stockholm Län | 1 |
| CLEVELAND | 1 |
| Ohio | 6 |

Select field pairs for Dependency check

Table: Vendor (Main)

X → Y

X (determinant set): City (Text) (97.3%)

Y (dependent attribute): Region (Lookup [Flat]) (38.47%)

Dependece Rate: 95.82 %

☐ Ignore Records with Nulls ( in Y )

Number of dependent Records: 19496

Number of non-dependent Records: 850

[Drill Down]  [Cancel]

| Table Name | Table Type | Field Name | Distinct Values | Cardinality | Min. Value | Max. Value | Min. Length | Max. Length | Null Count | Null Rate | String Count | String Rate | Numeric Count | Numeric Rate |
|---|---|---|---|---|---|---|---|---|---|---|---|---|---|---|
| Vendor | Main | Account Group | 20 | 0.1% | | | | | | | | | n/a | 0. |
| Vendor | Main | City | 3,068 | 15.5% | (Warning: The field cardinality is 15.5 and the number of distinct values do not exceeds the recommended size of a lookup table) | | | 10 | 1,303 | 6.4% | 3,779 | 19.8% | 19 | 0. |
| Vendor | Main | City Postal Code | 9,094 | 47.8% | | westpart, | 3 | 10 | 20,345 | 99.9% | n/a | n/a | 15,264 | 80. |
| Vendor | Main | Commodity | 1 | 100.0% | | n/a | n/a | n/a | 20,344 | 99.9% | n/a | n/a | n/a | r |
| Vendor | Main | Commodity Group | 2 | 100.0% | | n/a | n/a | n/a | 20,344 | 99.9% | n/a | n/a | n/a | r |
| Vendor | Main | Commodity Group Spe | 2 | 100.0% | | n/a | n/a | n/a | 1,029 | 5.1% | n/a | n/a | n/a | r |
| Vendor | Main | Country | 23 | 0.1% | | n/a | n/a | n/a | 0 | 0.0% | 20,346 | 100.0% | 0 | 0.0 |
| Vendor | Main | Create Date | 200 | 1.9% | | n/a | n/a | n/a | 10,081 | 49.6% | 1 | 0.1% | 10,264 | 99. |
| Vendor | Main | Credit Information Nur | 9,561 | 93.1% | 1001838 | 9E5556432474 | 7 | 11 | 20,346 | 100.0% | 0 | 0.0% | n/a | r |
| Vendor | Main | District | | n/a | | n/a | 0 | 0 | 7,708 | 37.9% | 12,148 | 96.1% | n/a | r |
| Vendor | Main | Fax | 11,394 | 90.1% | (0)141238559 | XX | 1 | 20 | 20,345 | 99.9% | n/a | n/a | 490 | 3. |
| Vendor | Main | Global Vendor Group II | 1 | 100.0% | | n/a | n/a | n/a | 10,627 | 52.2% | n/a | n/a | n/a | r |
| Vendor | Main | Group | 15,263 | | | n/a | n/a | n/a | 1,019 | 5.0% | n/a | n/a | n/a | r |
| Vendor | Main | Group Processed | 2 | 0.1% | | n/a | n/a | n/a | 20,346 | 100.0% | 0 | 0.0% | 0 | 0.0 |
| Vendor | Main | House Number | 0 | n/a | | n/a | 0 | 0 | 0 | 0.0% | 20,346 | 100.0% | 0 | 0.0 |
| Vendor | Main | Last Match Date | 4,289 | 21.1% | | n/a | n/a | n/a | 0 | 0.0% | 2,945 | 14.5% | 17,401 | 85. |
| Vendor | Main | Local Vendor ID | 19,819 | 97.4% | 1005 | ZZ996 | 2 | 10 | 0 | 0.0% | 0 | 0.0% | 20,346 | 100. |
| Vendor | Main | MDM Vendor ID | 20,346 | 100.0% | | n/a | n/a | n/a | 0 | 0.0% | n/a | n/a | n/a | r |
| Vendor | Main | Match Score | 2 | 0.1% | | n/a | n/a | n/a | 14,297 | 70.3% | n/a | n/a | n/a | r |
| Vendor | Main | Matched | 1 | 0.1% | | n/a | n/a | n/a | 1,019 | 5.0% | n/a | n/a | n/a | r |
| Vendor | Main | Name 1 | 17,122 | 84.2% | DR -DO NOT USE! | witre ab | 1 | 40 | 0 | 0.0% | 20,344 | 99.9% | 2 | 0. |
| Vendor | Main | Name 2 | 0 | n/a | | n/a | 0 | 0 | 20,346 | 100.0% | 0 | 0.0% | 0 | 0.0 |
| Vendor | Main | PO Box | 0 | n/a | | n/a | 0 | 0 | 20,346 | 100.0% | 0 | 0.0% | 0 | 0.0 |
| Vendor | Main | PO Box Postal Code | 0 | n/a | | n/a | 0 | 0 | 20,346 | 100.0% | 0 | 0.0% | 0 | 0.0 |
| Vendor | Main (calcul | Person | 15,535 | 89.8% | (0)141238550 | n/a | 1 | 16 | 3,038 | 14.9% | 16,351 | 94.5% | 957 | 5. |
| Vendor | Main | Phone | 0 | n/a | | n/a | n/a | n/a | 20,346 | 100.0% | n/a | n/a | n/a | r |
| Vendor | Main | Preferred Vendor | 1 | 0.8% | | n/a | n/a | n/a | 12,519 | 61.5% | n/a | n/a | n/a | r |
| Vendor | Main | Region | 63 | 48.7% | (OTV) | 1529 | 2 | 20 | 1,176 | 5.8% | 19,109 | 99.7% | 61 | 0. |
| Vendor | Main | Search Term 1 | 9,341 | | | 99999999 | 6 | 9 | 20,346 | 100.0% | 0 | 0.0% | 0 | 0.0 |
| Vendor | Main | Search Term 2 | 1,427 | 78.5% | 4487172 | 411526813 | 9 | 9 | 20,345 | 99.9% | n/a | n/a | 1,817 | 99. |
| Vendor | Main | Source System ID | 8 | 100.0% | 411526813 | n/a | 0 | 0 | 20,346 | 100.0% | n/a | n/a | 1 | 100. |
| Vendor | Main | Street | 13,918 | 87.0% | VE, SUITE 1000 Wilshire blvd 1800 | | 1 | | | 21.4% | 15,923 | 99.5% | 78 | 0. |
| Vendor | Main | Tax Number 1 | 333 | 96.8% | 10639419 E9696434720001 | | 7 | | 0 | 0.0% | 72 | 20.9% | 272 | 79. |
| Vendor | Main | Tax Number 2 | | n/a | | n/a | n/a | n/a | 20,346 | 100.0% | 1 | 0.1% | 0 | 0.0 |
| Vendor | Main | Tax Number 3 | 1 | 100.0% | | n/a | 0 | 0 | 20,346 | 100.0% | 0 | 0.0% | 0 | 0.0 |
| Vendor | Main | Tax Number 4 | 0 | n/a | | n/a | n/a | n/a | 20,346 | 100.0% | 20,346 | 100.0% | 0 | 0.0 |
| Vendor | Main | Update Date | 9,964 | 49.0% | | n/a | n/a | n/a | 0 | 0.0% | 0 | 0.0% | 20,346 | 100. |
| Vendor | Main | Updated By | 3 | 0.1% | Admin | QLARWEF | 5 | 7 | 0 | 0.0% | 20,346 | 100.0% | 0 | 0.0 |
| Vendor | Main | VAT Registration Numb | 8,870 | 88.1% | | 0)8556599579901 | 1 | 15 | 10,272 | 50.5% | 9,777 | 97.1% | 297 | 3. |

MDM Data Profiling Issues for 'IS_Ericsson_Integration' (English [US]), 11/8/2007

| DQ Dimension | Issue Category | Table/Field Name | Issue Description | How to Resolve |
|---|---|---|---|---|
| Schema Verification | Text Usage | Vendor.City | The field is defined as text field but contains values that are numeric. | Check field records that are numeric |
| Uniqueness | Field Cardinality | Vendor.City | The field cardinality is 15.5 and the number of distinct values do not exceeds the recommended size of a lookup table | Change field type from text to lookup flat, and the required lookup table. |
| Schema Verification | Text Usage | Vendor.City Postal Code | The field is defined as text field but contains values that are numeric. | Check field records that are numeric |
| Schema Verification | Text Usage | Vendor.Credit Information Number (DUNS) | The field is defined as text field but contains values that are numeric. | Check field records that are numeric |
| Schema Verification | Field Length | Vendor.Fax | The field length definition is longer compare to the actual maximum field length. | Resize field length definition |
| Schema Verification | Text Usage | Vendor.Fax | The field is defined as text field but contains values that are numeric. | Check field records that are numeric |
| Schema Verification | Text Usage | Vendor.Local Vendor ID | The field is defined as text field but contains values that are numeric. | Check field records that are numeric |
| Schema Verification | Text Usage | Vendor.Name 1 | The field is defined as text field but contains values that are numeric. | Check field records that are numeric |
| Schema Verification | Field Length | Vendor.Phone | The field length definition is longer compare to the actual maximum field length. | Resize field length definition |
| Schema Verification | Text Usage | Vendor.Phone | The field is defined as text field but contains values that are numeric. | Check field records that are numeric |
| Schema Verification | Text Usage | Vendor.Search Term 1 | The field is defined as text field but contains values that are numeric. | Check field records that are numeric |
| Schema Verification | Text Usage | Vendor.Street | The field is defined as text field but contains values that are numeric. | Check field records that are numeric |
| Schema Verification | Text Usage | Vendor.Tax Number 1 | The field is defined as text field but contains values that are numeric. | Check field records that are numeric |
| Schema Verification | Text Usage | Vendor.Tax Number 2 | The field is defined as text field but contains values that are numeric. | Check field records that are numeric |
| Uniqueness | Field Cardinality | Vendor.Updated By | The field cardinality is 0.1 and the number of distinct values do not exceeds the recommended size of a lookup table | Change field type from text to lookup flat, and the required lookup table. |
| Schema Verification | Field Length | Vendor.VAT Registration Number | The field length definition is longer compare to the actual maximum field length. | Resize field length definition |
| Schema Verification | Text Usage | Vendor.VAT Registration Number | The field is defined as text field but contains values that are numeric. | Check field records that are numeric |
| Accuracy | Meaningless Values | Vendor.City | <add short description> | <suggest a solution> |
| Accuracy | Format Inconsistency | Vendor.Phone | Details <specify...> | <suggest a solution> |

Figure 4

| Table Name | Table Type | Field Name | Numeric Count | Numeric Rate | Max. Multi-Values | Avg. Multi-Values | Pattern Count | Metaphone Count | Issues |
|---|---|---|---|---|---|---|---|---|---|
| Vendor | Main | Account Group | n/a | n/a | | | | 0 | |
| Vendor | Main | City | 19 | 20.1% | | | 0 | 0 | W |
| Vendor | Main | City Postal Code | 15,264 | 80.2% | 0 | 0 | 0 | 0 | |
| Vendor | Main | Commodity | n/a | n/a | 0 | 0 | 0 | 0 | |
| Vendor | Main | Commodity Group | n/a | n/a | 0 | 0 | 0 | 0 | |
| Vendor | Main | Commodity Group Spe | n/a | n/a | 0 | 0 | 0 | 0 | |
| Vendor | Main | Country | 0 | 0.0% | 0 | 0 | 0 | 0 | |
| Vendor | Main | Create Date | 0 | 0.0% | 0 | 0 | 0 | 0 | |
| Vendor | Main | Credit Information Num | 10,264 | 99.9% | 0 | 0 | 0 | 0 | W |
| Vendor | Main | District | 0 | 0.0% | 0 | 0 | 0 | 0 | |
| Vendor | Main | Fax | 490 | 3.9% | 0 | 0 | 0 | 0 | W |
| Vendor | Main | Global Vendor Group II | n/a | n/a | 0 | 69 | 4 | 0 | |
| Vendor | Main | Group | n/a | n/a | 0 | 0 | 0 | 0 | |
| Vendor | Main | Group Processed | 0 | 0.0% | 0 | 0 | 0 | 0 | |
| Vendor | Main | House Number | 0 | 0.0% | 0 | 0 | 0 | 0 | |
| Vendor | Main | Last Match Date | 0 | 0.0% | 0 | 0 | 0 | 0 | |
| Vendor | Main | Local Vendor ID | 17,401 | 85.5% | 0 | 0 | 0 | 0 | W |
| Vendor | Main | MDM Vendor ID | 20,346 | 100.0% | 0 | 0 | 0 | 0 | |
| Vendor | Main | Match Processed | n/a | n/a | 0 | 1,178 | 5 | 0 | |
| Vendor | Main | Match Score | n/a | n/a | 0 | 0 | 0 | 0 | |
| Vendor | Main | Matched | n/a | n/a | 0 | 0 | 0 | 0 | |
| Vendor | Main | Name 1 | 2 | 0.1% | 0 | 0 | 0 | 0 | W |
| Vendor | Main | Name 2 | 0 | 0.0% | 0 | 0 | 0 | 0 | |
| Vendor | Main | PO Box | 0 | 0.0% | 0 | 0 | 0 | 0 | |
| Vendor | Main | PO Box Postal Code | 0 | 0.0% | 0 | 0 | 0 | 0 | |
| Vendor | Main (calcula | Person | 0 | 0.0% | 0 | 0 | 0 | 0 | |
| Vendor | Main | Phone | 957 | 5.5% | 0 | 0 | 269 | 17 | W |
| Vendor | Main | Preferred Vendor | n/a | n/a | 0 | 0 | 0 | 0 | |

500

Tooltip: Warning: The field is defined as text field but contains values that are numeric MDM Navigation Bar — Return, Previous, Next

| Name | Alias | Definition | Type | No. of Linked Categories | Attribute Value Count | Text Values Count | Numeric Values Count | Min. Text Value | Max. Text Value | No. of Assigned Records | No. of Records w/ Attribute Values | Usage Rate of Attribute Values In Record | No. Dist Attr Val in L |
|---|---|---|---|---|---|---|---|---|---|---|---|---|---|
| Drive Type | | | text | 2 | 1 | 1 | 0 | Square | Square | 24 | 4 | 16.7% | |
| Blade Finish | | | text | 1 | 1 | 1 | 0 | Chrome | Chrome | 150 | 6 | 4.0% | |
| Unit System | | | text | 7 | 3 | 3 | 0 | Inch | Metric | 2,480 | 1536 | 61.9% | |
| Number of Compartments | | | Numeric(No | 1 | n/a | n/a | n/a | n/a | n/a | 34 | 34 | 100.0% | |
| Carrying Method | | | text(Multi) | 1 | 1 | 1 | 0 | None | None | 34 | 34 | 100.0% | |
| Tip Size Symbol (Min) | | | text(Multi) | 1 | 13 | 13 | 0 | #0 | T9 | 150 | 82 | 54.7% | |
| Tip Size Symbol (Nom) | | | text(Multi) | 1 | 35 | 35 | 0 | #0 | T9 | 920 | 249 | 27.1% | |
| Tip Type | | | text(Multi) | 3 | 11 | 11 | 0 | Awl | Torx® | 1,093 | 760 | 69.5% | |
| Tip Coating | | | text | 1 | 3 | 3 | 0 | Black Oxide | Ni(Nickel) | 920 | 339 | 36.9% | |
| Tip Finish | | | text(Multi) | 1 | 1 | 1 | 0 | Blasted | Blasted | 920 | 22 | 2.4% | |
| Tip Size Symbol (Max) | | | text(Multi) | 1 | 13 | 13 | 0 | #0 | T40 | 150 | 84 | 56.0% | |
| Opening Type | | | text(Multi) | 4 | 18 | 18 | 0 | Box | Strap | 2,264 | 1323 | 58.4% | |
| Peen Shape | | | text(Multi) | 1 | 6 | 6 | 0 | Ball | Straight | 379 | 155 | 40.9% | |
| Shank Material | | | text(Multi) | 1 | 1 | 1 | 0 | Molybdenum | Molybdenum | 1,076 | 13 | 1.2% | |
| Mechanism | | | text(Multi) | 1 | 2 | 2 | 0 | Ratchet | Return Spring | 159 | 11 | 6.9% | |
| Number of Points | Abraham | | Numeric(No | 3 | n/a | n/a | n/a | n/a | n/a | 2,114 | 882 | 41.7% | |
| Offset Angle | | | text(Multi) | 1 | 10 | 10 | 0 | 0° | 1/2° Box Sid | 1,076 | 807 | 75.0% | |
| Jaw Material | | | text(Multi) | 1 | 1 | 1 | 0 | ed Alloy St | ped Alloy St | 1,076 | 0 | 0.0% | |
| Jaw Type | | | text(Multi) | 1 | 3 | 3 | 0 | Angled | Serrated | 159 | 78 | 49.1% | |
| Length Group | | | text(Multi) | 4 | 5 | 5 | 0 | Extra Short | Stubby | 2,264 | 1987 | 87.8% | |
| Head Angle | | | text(Multi) | 2 | 7 | 7 | 0 | o Box Sides | 5° Open Sid | 1,076 | 785 | 73.0% | |
| Head Material | | | text(Multi) | 2 | 10 | 10 | 0 | Aluminum | Zinc Alloy | 382 | 223 | 58.4% | |
| Internal Ring Dash Number[Min] | | | Numeric(Mi | 0 | n/a | n/a | n/a | n/a | 0 | Request Remote Control | | 0.0% | |
| Internal Ring Dash Number[Max] | | | Numeric(Mi | 0 | n/a | n/a | n/a | n/a | 0 | Request Annotation | | 0.0% | |
| Handle Material | | | text | 5 | 5 | 5 | 0 | Aluminum | Wo | | | 40.8% | |
| Handle Type | | | text(Multi) | 5 | 15 | 15 | 0 | Bent | Vinyl | View | | 102.3% | |
| Hardness Grade | | | text | 1 | 5 | 5 | 0 | Extra Hard | Tou | Exit Desktop Sharing | | 55.6% | |
| External Ring Dash Number[Min] | | | Numeric(Mi | 0 | n/a | n/a | n/a | n/a | 0 | 0 | 0 | 0.0% | |
| External Ring Dash Number[Max] | | | Numeric(Mi | 0 | n/a | n/a | n/a | n/a | 0 | | | 0.0% | |
| Face Material | | | text(Multi) | 1 | 7 | 7 | 0 | Brass | Titanium | 379 | 223 | 58.8% | |
| Face Shape | | | text(Multi) | 2 | 3 | 3 | 0 | Octagon | Square | 442 | 277 | 62.7% | |
| Blade Type | | | text(Multi) | 2 | 7 | 7 | 0 | Hex | are w/Hex Bd | 1,070 | 854 | 79.8% | |
| Body Material | | | text(Multi) | 3 | 3 | 3 | 0 | a Vanadiun | Steel | 1,076 | 703 | 65.3% | |
| Coating | | | text(Multi) | 4 | 6 | 6 | 0 | Black Oxide | Zn(Zinc) | 1,732 | 196 | 11.3% | |
| Mounting | | | text(Multi) | 2 | 4 | 4 | 0 | Clamp | Screw | 65 | 76 | 116.9% | |
| Blade Coating | | | text | 1 | 4 | 4 | 0 | Black-Oxidstic | Unspecifi | 920 | 620 | 67.4% | |
| Blade Material | | | text | 2 | 4 | 4 | 0 | Ceramic | Steel | 1,070 | 678 | 63.4% | |
| Thumb Pattern | | | text | 2 | 2 | 2 | 0 | Straight | Wing | 1,042 | 90 | 8.6% | |
| Usage Environment | | | text(Multi) | 1 | 11 | 11 | 0 | Chemicals | Weather | 1,847 | 3866 | 209.3% | |
| Ventilation | | | text | 1 | 3 | 3 | 0 | Direct Venti | n-Specified V | 30 | 30 | 100.0% | |
| Sole Material | | | text | 1 | 1 | 1 | 0 | Rubber | Rubber | 79 | 0 | 0.0% | |

| | C | D | H | I | J | K | L | M | N | O | P | Q | R |
|---|---|---|---|---|---|---|---|---|---|---|---|---|---|
| 1 | Taxonomy | Category | No. of Linked Numeric | No. of Assigned | No. of Assigned Records w/ Attribute Use | Rate of Assigned Records w/ Attribute Usage | No. of Assigned Records w/o Attribute Used | Rate of Assigned Records w/o Attribute Usage | No. of Used Attributes | Rate of Used Attributes | No. of Unused Attributes | Rate of Unused Attributes | Issues |
| 2 | Categories | Organization | 0 | 406 | 3 | 0.7% | 403 | 99.3% | 3 | 100.0% | 0 | 0.0% | W |
| 3 | Categories | Person | 4 | 3 | 2 | 66.7% | 1 | 33.3% | 2 | 40.0% | 3 | 60.0% | W |
| 4 | Categories | Group | 1 | 0 | 0 | 0.0% | 0 | 0.0% | 0 | 0.0% | 1 | 100.0% | |

800

METHOD FOR VERIFICATION OF DATA AND METADATA IN A DATA REPOSITORY

BACKGROUND OF THE INVENTION

1. Field of the Invention

Embodiments of the invention described herein pertain to the field of computer systems. More particularly, but not by way of limitation, one or more embodiments of the invention enable an invention for modeling a master data repository to evaluate the efficiency of the repository schema and to evaluate the accuracy and validity of the data and metadata within the repository.

2. Description of the Related Art

Accuracy and validity of data in a large commercial data repository is of critical importance. However, working with large data repositories often means working with data of questionable accuracy and validity. Such repositories may involve hundreds of tables and millions of records. Data may sometimes be imported from one or more sources into a master repository. Data may originally have been input by many different operators, over varying periods of time, using different input programs with different levels of quality control and error checking. The overall cost to an operation to determine data accuracy and validity of such repositories can be significant, assuming it is even possible at all. But the overall cost of relying on inaccurate or invalid data can also be significant.

Furthermore, data imported or input into a large data repository is almost always associated with metadata. Metadata is generally defined as "data about data." That is, metadata is information that describes the meaning or significance of data. "Columbus" may be data in a database or data repository. While we may guess that "Columbus" is a proper name, we cannot be sure without its associated metadata if Columbus is the last name of an explorer, a holiday, the name of a book, the subject of a painting, or a city in Ohio, Ind., or Ga., just to name a few possibilities. Without accurate metadata the data "Columbus" is at best meaningless, at worst detrimental. For example, if Columbus is a city, but the data is erroneously imported such that the data ends up in a database field for "Street Name" an organization relying on this entry may ship a product to a non-existent address because of invalid data. Or a critical part might be shipped to Columbus, Ohio instead of Columbus, Ga., if the city field held "Columbus" and the "State" field was blank, all because of incomplete data in a master data repository.

Finally, large commercial data repositories are often changed and revised over their lifetimes. Tables and columns may be added, field meanings and purposes may be expanded, data dictionaries edited. As new data sources are married to the repository the efficiency of the originally well designed database schema may degrade with duplicate fields, and poor choices in dependencies between fields introduced by well intentioned maintenance engineers.

There are currently no known systems that support profiling the generalized hierarchy of large commercial data repositories for evaluating the efficiency of schema as well as validity and accuracy of data and metadata within a master data repository.

For at least the limitations described above there is a need for a tool for modeling a master data repository to evaluate the efficiency of the repository schema and to evaluate the accuracy and validity of the data and metadata within the repository.

BRIEF SUMMARY OF THE INVENTION

One or more embodiments of the invention are directed toward a tool for modeling a master data repository to evaluate the efficiency of the repository schema and to evaluate the accuracy and validity of the data and metadata within the repository.

One or more embodiments of the invention employ a computer and associated software tool for profiling large computer data repositories. Users of such large repositories can easily determine the size of the repository using conventional maintenance tools, but cannot easily determine the quality of the data that makes up the repository. The institutional and financial costs of relying on erroneous data are well known. Further, once erroneous data is discovered, how is such data to be corrected? A method to analyze the quality data in a data repository is needed, as well as method to improve the quality of data in such a repository. An invention that may be embodied in one or more software tools to perform such profiling and repair a large data repository will be described.

Another concern in operations relying on large data repositories is the validity and accuracy of metadata. Metadata is generally defined as "data about data." That is, metadata is information that describes the meaning or significance of data. A method to verify the accuracy of metadata is as important to controlling operational costs as is the need to verify the accuracy of data in a repository. When large amounts of data and its associated metadata are entered into or imported into a data repository from another source, there is no known method to verify its accuracy and validity. An invention embodying a method to verify the accuracy and validity of metadata will be described.

An additional concern in operations relying on large data repositories is the efficiency of the database schema of large data repositories. A database schema is a way of describing the actual values of the data in a data repository. A profiling tool that embodies one or more aspects of the present invention will be described to illustrate the methods of the present invention, not by way of limitation but by way of illustration of the concepts and ideas of the invention. The profiling tool embodiment of the present invention may connect to any specified data repository to create a repository profile. In a preferred embodiment, different aspects of a data repository or database may be viewed and interacted with separately in the profiler. Treating a database or data repository as a layered entity to better present information regarding required improvements to the data, metadata, and structure of the data repository is a novel aspect of the present invention.

BRIEF DESCRIPTION OF THE DRAWINGS

The above and other aspects, features and advantages of the invention will be more apparent from the following more particular description thereof, presented in conjunction with the following drawings wherein:

FIG. 3 illustrates a report showing field data profiling in one or more embodiments of the invention.

FIG. 4 illustrates a report identifying issues in a data repository schema in one or more embodiments of the invention.

FIG. 7 illustrates a report of attribute data profiling in one or more embodiments of the invention.

DETAILED DESCRIPTION

An invention for modeling a master data repository to evaluate the efficiency of the repository schema and to evaluate the accuracy and validity of the data and metadata within the repository will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

The brief summary of the invention provides information concerning field types that are utilized in one or more embodiments of the invention. Readers should note that one or more embodiments of the invention are used in various contexts and provide users with a way to conform a set of input data to a target schema. The target schema can vary but in at least one embodiment of the invention conforms to the requirements of SAP's Master Data Management (MDM) software solution. In modeling an MDM schema there are specific requirements that are MDM specific. For example, an MDM schema typically utilizes a single main table; it may also make use of qualifiers, have multi-lingual values and/or have other MDM specific constraints. One of ordinary skill in the art will understand that the invention contemplates embodiments that operate on other types of target schema, but for clarity in describing the invention, and not by way of limitation, the following description will focus on use of SAP's MDM specific target schema terminology and concepts.

By way of illustration, but not limitation, the following aspects of the invention will be described regarding a data repository designed to contain information for a large commercial vendor system that accepts orders, matches orders to products from various vendor sources, tracks and ships the orders to customers, populates itself from information imported from other vendors databases regarding available products, and prepares catalog information for publication in multiple languages and international regions and countries, following various business rules regarding language, word choice, word order, spelling color, image selection, import restrictions and other restrictions on terminology and publication in various countries and regions around the world. Such a large data repository with various automated sources of data requires advanced techniques to verify and validate the schema, as well as the accuracy and validity of the data within the repository. One of ordinary skill in the art will realize that this invention and its methods and techniques are not limited to this exemplary illustration, but can be beneficially applied to other large data repositories without undue experimentation.

A data repository schema may be viewed as multiple layers, or collections, of tables, fields, or business rules in one or more embodiments of the present invention. The database taxonomy or generalized hierarchy may also be viewed as a layer containing a collection of categories and attributes. When decomposed in this way, the profiler of the present invention may allow a data repository to be examined statistically layer by layer, which permits the profiler to provide particularized menus specific to each type of operation appropriate only to that particular layer. This approach allows each layer of the repository to be examined, analyzed and repaired in a way that makes sense for layer that is being profiled. A data profiler that embodies one or more aspects of the present invention is described herein including but not limited to examination, evaluation and repair of layers including: Tables Statistics and Checks; Fields Statistics and Checks; Generalized Hierarchy Statistics and Checks; and Business Rules verification and validation. Optional statistics that may be collected and checks that may be performed for each layer will be described in more detail in the following sections.

Tables Statistics and Checks

One level upon which to evaluate a data repository for metadata and data accuracy and validity is to evaluate the table structure of the repository. A repository may have one or more than one table, and the tables may be in a hierarchy or flat structure. Various statistical queries may be performed to evaluate the accuracy and validity of the data, metadata, and structure of the table hierarchy to provide the user with information at this level that may be used to correct the data and/or improve the structure of the data repository.

Figure 2:
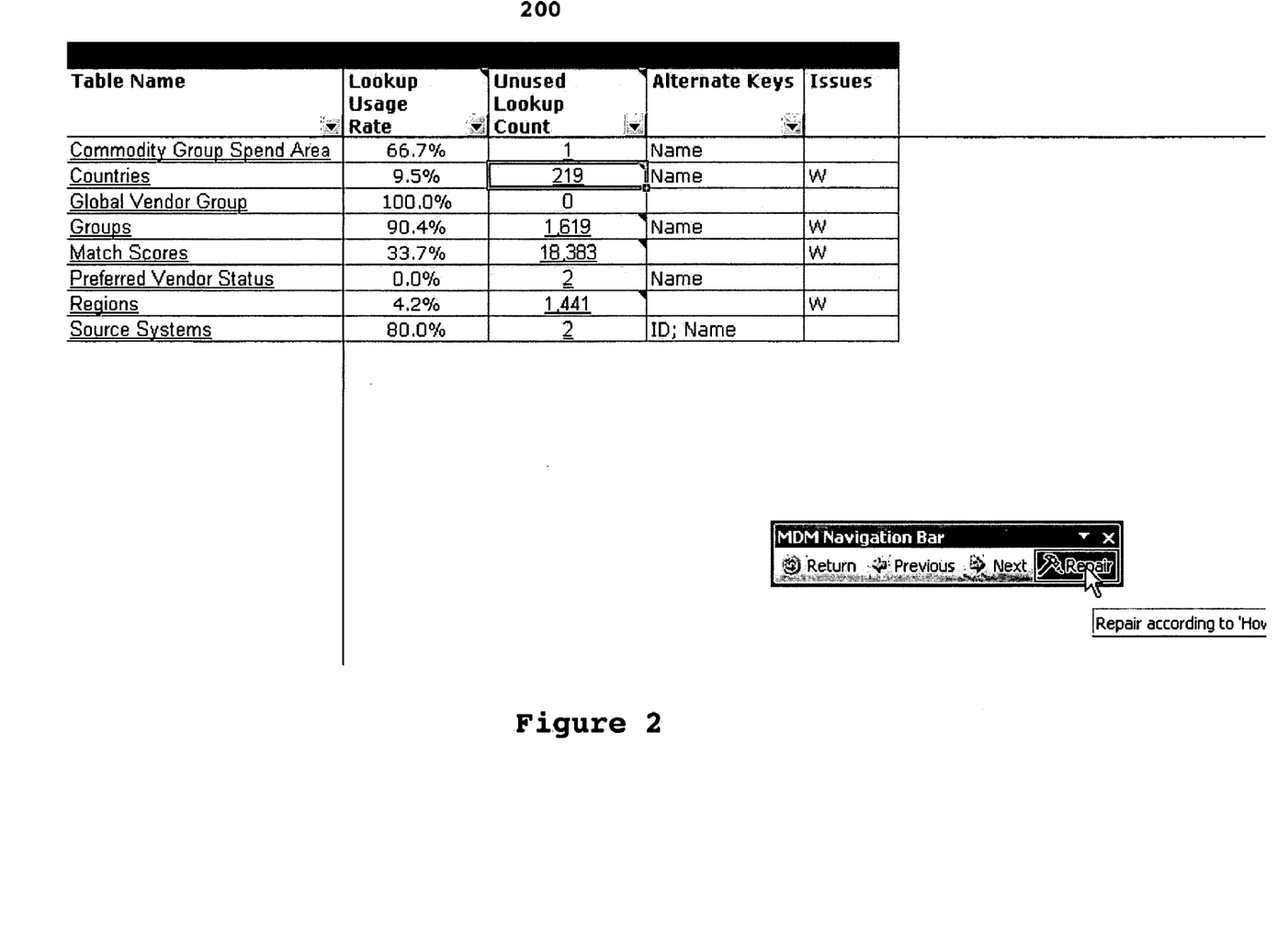
FIG. 2 illustrates a report showing lookup usage rate and unused lookup counts in one or more embodiments of the invention.

One such statistical check is to evaluate the lookup fields of the table or tables. FIG. 2 illustrates the evaluation of a table's lookup data field usage count and rate and unused lookup count. These statistics may later be translated into checks that may indicate to what extent a lookup field is being utilized, and offer the opportunity to repair inaccurate data by allowing the user to eliminate unused lookup values. Report 200 of FIG. 2 shows a row for a data field labeled "Countries" which has a Lookup Usage Rate of only 9.5% and an Unused Lookup Count of 219 possible settings. This likely indicates many possible countries in the world that are never used in the subject data repository. It may be efficient to eliminate never used countries from the repository lookup options to make the most efficient use of the space available in the table, as well as to reduce the error rate of countries being entered into the data that were unintentionally selected by a customer. The repair option of dialog box 210 may allow users to create a lookup value for countries, as in this example, in one or more embodiments of the present invention, using links to database design tools with methods well known to those of ordinary skill in the art.

An additional check that may be performed during table profiling includes a check for alternate key detection. This check helps to determine which fields might be available as unique key fields for a table by statistically determining the functional dependencies between the various fields within a table.

Tables may also be evaluated for duplicate records, checked according to a display field's definitions, the average cardinality rates of date, the number of hierarchy levels of the table (which is a computation of the depth of the hierarchy of the table) and the maximum number of child nodes in the hierarchy table, to name a few examples. The former together give a perspective regarding the magnitude of a hierarchy table, which may be useful in evaluating the efficiency of the repository. In addition, if a hierarchy structure was used in designing the repository and the maximum number of child nodes in the hierarchy table statistics is small or none, it may be possible to transform the hierarchy into a flat structure.

Field Statistics and Checks

FIG. 3 illustrates a report showing various statistical checks that may be performed on fields in a data repository in one or more embodiments of the present invention. Field data profiling may run statistical checks including those of Report 300, such as number of distinct values for a given field, cardinality of a field, minimum and maximum values, minimum and maximum length, a count of the null entries and null rate, and other such field statistics.

FIG. 4 illustrates the type of Report 400 that may be shown to indicate that issues exist regarding the use of text fields and suggests methods by which schema inefficiency, verification failure, or data accuracy errors may be corrected. This level of analysis and ability to repair are a level above the statistical analysis described elsewhere herein, and relies on that analysis to provide the proper identification of the issue analysis necessary to point out to the user the type of issues illustrated by way of example in FIG. 4.

Figure 5:
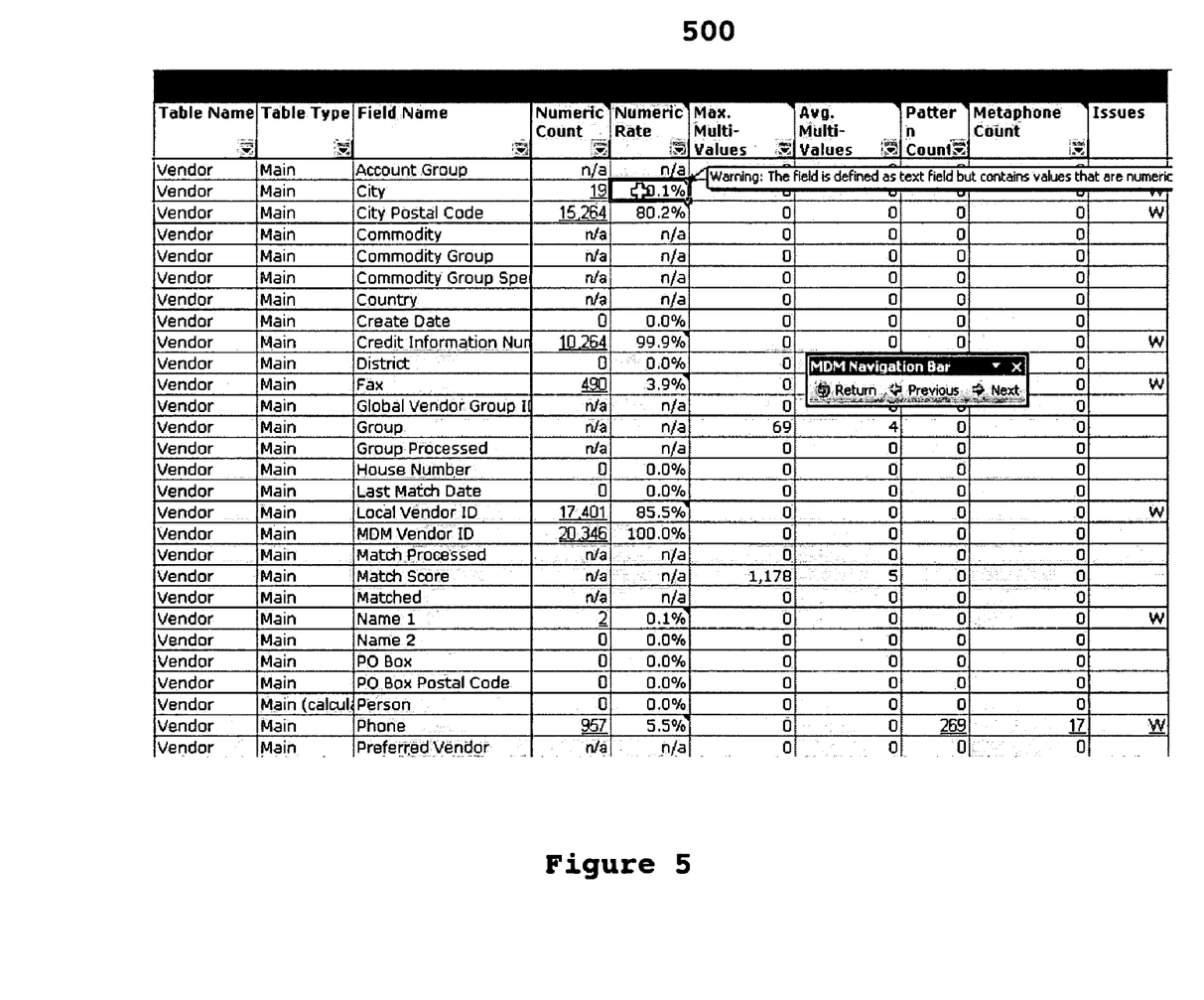
FIG. 5 illustrates a report showing multi-value counts for fields in one or more embodiments of the invention.

FIG. 5 is a variation on the field data profiling of the present invention showing two columns of Report 500 indicate values for maximum multi-values and average multi-values. It may be an advantage to check the repository for these instances, because the presence of multi-value fields may create inefficiencies in the repository, as is well known in the art. Other checks of fields in the repository that may be used in the spirit of the present invention include checking for large text usage, whereby a check is run for fields defined as large text fields, but where the data in the fields does not warrant such a large storage allocation. Additionally, a text usage check may be used to infer if a text field may be transformed into a numeric field, saving space in the repository. Another check may include a cross table redundancy check, which may display pairs of fields from different tables to show a high level of similarity according to their corresponding values. This check may help to identify wasteful duplicate data in a repository.

Pattern Analysis: Pattern analysis is provided by embodiments of the present invention to assist in the detection of invalid and/or inaccurate data. One type of pattern analysis is a cardinality check. A cardinality check is performed by dividing the distinct values in a column from the overall number of values to compute the number of distinct elements in the set. If a text column contains only a few distinct values (low cardinality) it may be much more efficient for this column to be transformed into a lookup value, as lookup values are stored using less bits than text data.

The present invention provides a method to examine the repository schema and determine the redundancy of the schema. Redundancy, in this sense, is a measure of the overlap between different columns in different tables in the repository. Redundancy in a data repository schema might occur because an engineer modeled the same data twice. For example, if data needed to be referenced from two different tables, columns might be created for the data in both tables. But because such data was treated as reference data, it would have been sufficient to only store the data in one location. Validation of the repository schema would identify such schema redundancy. Automated identification of data redundancy in repository schema involves determination of redundancy using more than simple comparison of column names to determine redundant data. In one or more preferred embodiments, detection of overlapping values produced the optimal method of identifying redundancy in repository schema.

Figure 1:
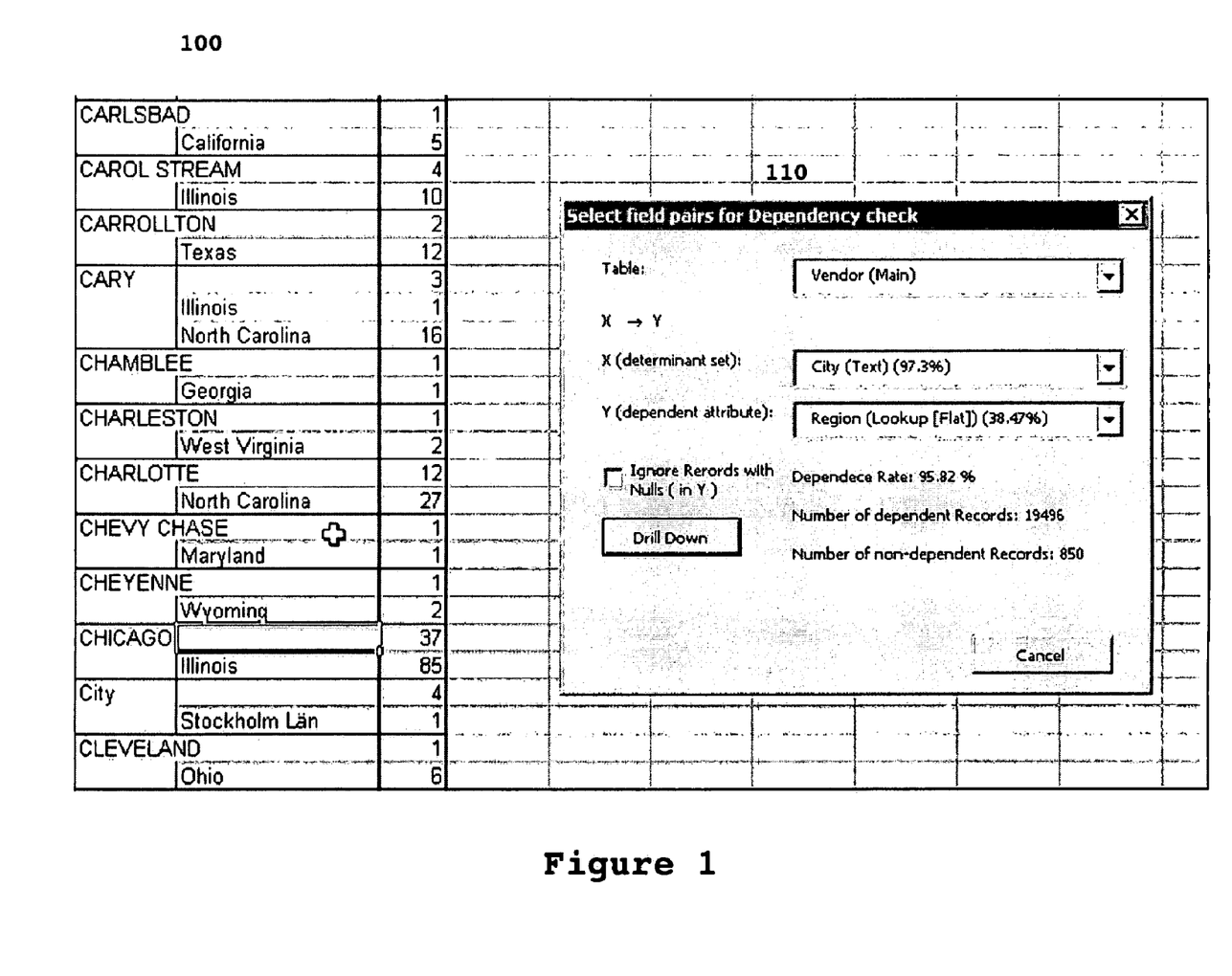
FIG. 1 illustrates a user interface and output report for a field dependency check in one or more embodiments of the invention.

Dependency Check: FIG. 1 illustrates another consideration in the profiling of the efficiency of data repository schema involves evaluating the dependency between two columns or between two pairs of fields in a data repository. Where a 100% dependency exists, a business rule is often a more efficient description of the relationship of the data. For example, where a field exists for a region and a country, where the region is Calif., the country is implied—it is always the United States of America. In that case there is a 100% data dependency, and a rule might be developed to ensure that when Calif. is selected that the country is always set to the USA. However, not all data dependency evaluations are this simple. FIG. 1 illustrates dialog box 110 from an exemplary application embodying the present application, the result of a query of from the data repository of the "City" and "Region" fields, as well as a count of the number of hits of that pair in the data repository. For example, at Report 100, the city of Cary appears in the repository with no state listed 3 times, with Illinois listed one time, and with N.C. listed 16 times. Dialog box 110 allows a user to profile for data dependency by selecting a table, and two fields—in this example "City" and "Region" are selected. The resulting evaluation shows a 95.82% dependency rate. In one or more preferred embodiments, the "drill down" button of dialog box 110 allows users to see at least the detail displayed in table 100.

Data dependency analysis can also be used to detect and correct errors in data. In a preferred embodiment an application would allow the user to drill down to the details below the dependency statistics, seeing that as in Report 100 for the dependency of the city of Chicago, there are 85 records have Chicago as the city and Ill. as the state, but 37 others have Chicago as the city but no value in the State field. Therefore, it could be determined that those 37 rows should indicate Illinois as the state, and require appropriate correction using a mask, as indicated herein. A dependency check as described herein may also be used to find incorrect values, such as the entry that indicates the city of "City" (four entries) and one with the state of "Stockholm Lan" (one entry). All five of these entries clearly represent invalid data and need correction.

FIG. 5 illustrates the type of data accuracy and validity check that a profiler of the present invention may perform on a data repository in the "Fields" layer. Users performing a "fields" profile could be allowed to select either one table or all the tables of a data repository. In one or more preferred embodiments of the present invention, the fields layer may be profiled by performing a quality profile using options such as a Patterns or "Metaphones" analysis.

As with a dependency check, the data in the fields is evaluated to identify similar data. But in this case the goal is to identify data errors instead of schema inefficiencies. An application embodying the present invention may perform database queries to implement a "metaphones" algorithm, such as is well-known in the art for checking for misspelling and errors in data, to profile the accuracy of data in a large data repository. This use of the metaphone algorithm for database profiling is unique. The metaphone algorithm is a more advanced version of the better known Soundex algorithm. Metaphone analysis attaches an identical "metaphone code" data when that data phonetically "sounds" the same even if the word or words are spelled differently. This technique is very useful in identifying errors in data entry for text data.

One application embodying the present invention might provide the user a method of drilling down to display the data where the metaphone code was identical but the data was not, such that the user could change the actual data in the repository, or create an automated request to build a data mask and update operation or other means such that the appropriate row of data could be updated to reflect the correct data value, using techniques well known to those in the art of database programming.

Profiling using the statistics reports described herein is intended for use by experienced database design engineers and those as skilled in the art as to understand the implications of the results of the statistical analysis presented as examples in FIGS. 1-3 and 5-6. FIG. 4 illustrates a level of database profiling in the teaching of the present invention which may be used by less experience database operators and designers to run checks and correct data in a data repository. At this level, an operator might run the statistical checks, then immediately run a higher level profile report to determine a higher level dimension of data quality, review issue high level descriptions and learn how to resolve such issues. The present invention provides such guidance using the statistics as are described herein and gathered for reporting at a lower level of analysis, such as identifying where a text field erroneously contains numeric data. Preferred embodiments allow a user to drill down and see the actual data below the statistic that produced the error report. For example, that there are numbers in the "City" field. A preferred embodiment would allow the user to then add these records to the data profiling analysis for higher order evaluation, or instead indicate that these are meaningless problems.

The present invention may also be used to take the evaluation one step further and enable the user to repair problems detected in the data repository. Once inaccurate or invalid data is identified, the user may create a mask such that data may be written to the data repository wherein only the invalid data in the given row of the given table is altered by the write operation. The use of masks to alter data in a data repository, or any other technique for altering portions of a database are in keeping with the spirit of the invention.

Figure 6:
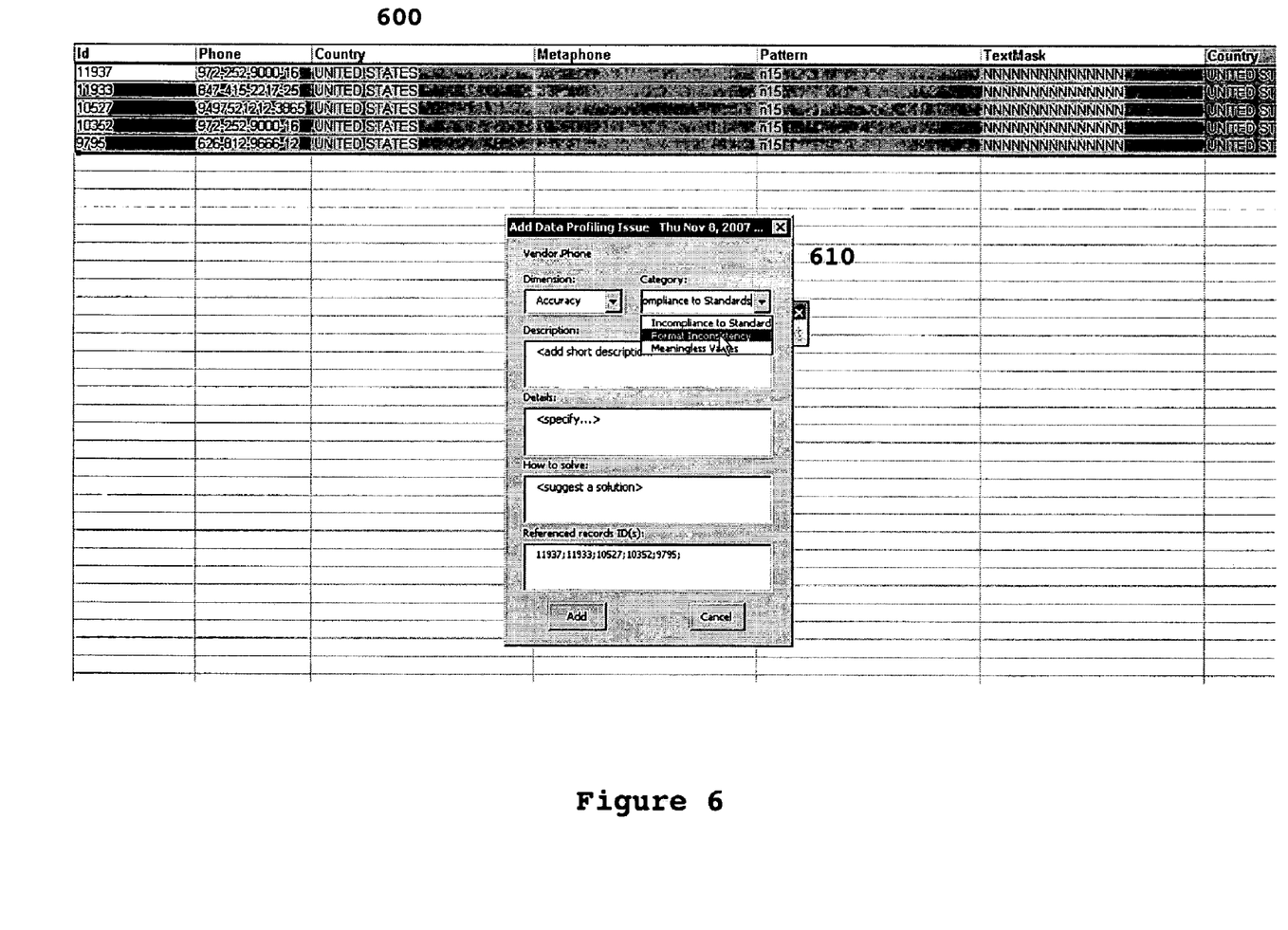
FIG. 6 illustrates a pattern analysis of a phone number field for format inconsistencies in one or more embodiments of the invention.

Pattern Analysis: FIG. 6 illustrates pattern analysis user interface 610 for one or more embodiments of the present invention. A pattern analysis may be used to determine how many different data patterns exist for data in a given field in the repository. A large number of patterns may indicate a problem with data validity or accuracy, particularly for highly formatted data fields, such as phone numbers, as shown for example in Report 600. Data may simply be input with various formats. A drill down function can then identify each row in the data repository that matches the identified erroneous pattern. Errors in data formatting may be fixed using data masks, as is well known in the art. Another data accuracy problem that can be identified with pattern analysis involves fields containing a limited number of legal values such as country names. Entries that produce unusual patterns may be outlying erroneous values that need correction. Additionally, evaluating such text fields for numeric values may also be done using pattern analysis to identify inaccuracy in data values.

Inefficient Data Schema: Various evaluations described in the present invention may be used to evaluate a data repository's efficiency. Using the techniques of the present invention, including running statistical queries on the data of repository, analyzing that data, and presenting the analysis to the user as issues identified to layers of the data repository, may also be applied to improve the efficiency of the overall schema of the data repository.

To evaluate the efficiency of the data schema, one approach in keeping with the present invention is to apply the business rules of the repository strictly to the data itself. A well designed schema is not only more efficient, but also tends to support maintaining an accurate repository. Large data repositories generally have a well established set of business rules. Data inaccuracy and invalidity can be highlighted by identifying data that violates the repository's business rules. Both dependency checks and redundancy checks, described elsewhere herein, may be used to identify business rule violations and find inefficiencies in the data schema. Dependency checks can be useful in identifying violations of business rules. Dependency checks look for duplication of data in different fields in the same table. Applying redundancy checks, as described herein, may identify multiple overlapping data in the schema and point out ways to restructure the repository to reduce data or tables. Redundancy checks identify fields that may not be in the same table but instead are between tables. For example, if the repository requires a list of countries, it is preferred for efficiency to have a single country table that is referenced from each place country data is needed. Statistical data provides the user insight to identify the overlap of data to help identify where it might be possible to reduce the dataset to a single table. If there is a large or even complete overlap of data, there may be a way to restructure the repository to take advantage of the overlap and collapse the data into a single table. In one or more embodiments, the invention provides a drill down feature such that the user can find each record that produced the identified redundancy issue.

Figure 8:
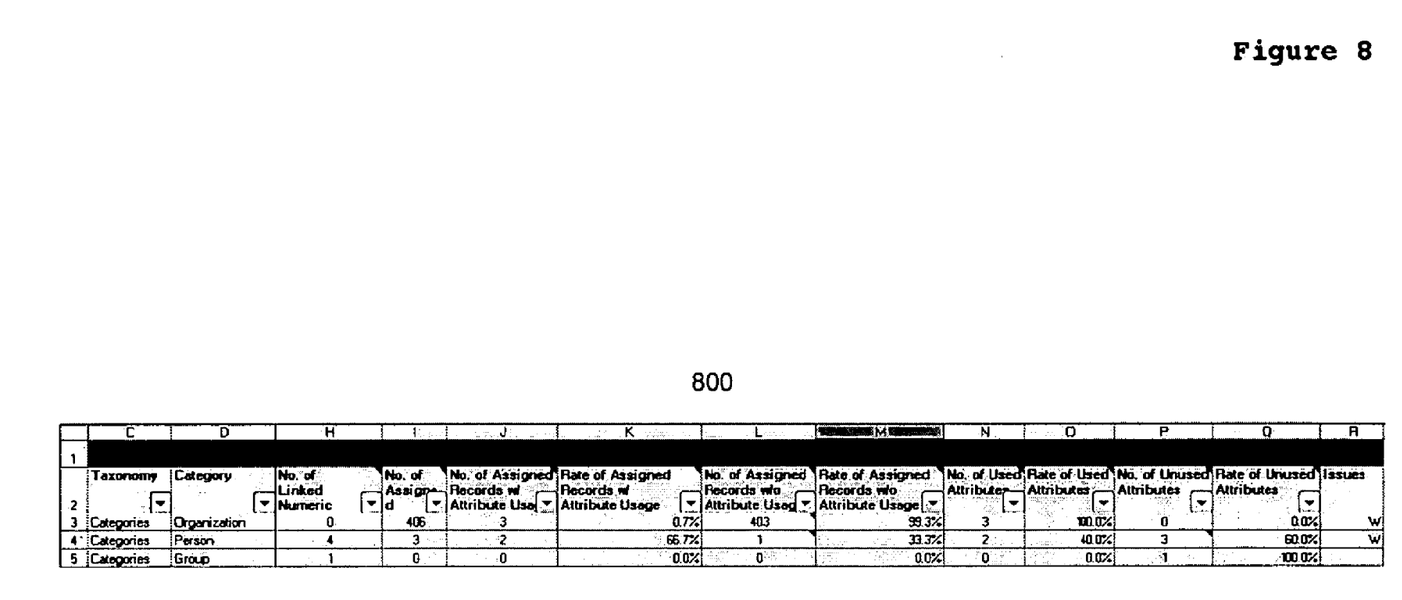
FIG. 8 illustrates a taxonomy report showing potential problems including number of assigned records with/without attribute usage, rate of assigned records with/without attribute usage, number and rate of used/unused attributes.

Attributes and Categories:

Another aspect of evaluation of the efficiency of a data repository in the present invention is to evaluate the taxonomy of the repository. Taxonomy evaluation may be performed on either attributes or categories of the repository. FIG. 7 illustrates an example of the type of statistics that may be collected to evaluate the attributes and categories of a data repository in one or more embodiments of the present invention. Report 700 includes statistical analysis of linked categories, attribute values, text values, numeric values and other illustrated examples. FIG. 8 illustrates taxonomy Report 800 showing potential problems including number of assigned records with/without attribute usage, rate of assigned records with/without attribute usage, number and rate of used/unused attributes. Specifically, in the "Categories" taxonomy, the "Organization" category 403 records without attribute usage, while the "Person" category shows 3 unused attributes. The "number of unused attributes" value may indicate that the attributes were linked to the wrong category for example. In one or more embodiments of the invention, thresholds may be set to allow for the maximum number of records to process, for example when relying on soft indicators. This allows for minimizing the processing to a configurable number when qualitatively checking large data sets.

Attributes: The profiler of the present invention allows a user to verify efficiency of a data repository by measuring performance of the repository in terms of attributes and categories. Attributes are another way of structuring a database schema where one or more attributes are associated with a main table database entity, yet which may be stored in an attribute table to conserve memory utilization. Attributes are also sometimes referred to, including herein, as fields and columns, although fields and columns making up attributes may be stored in a separate table wherein certain attributes for example only apply to certain rows of another table. Each attribute may be evaluated to determine if the attribute would be more efficient as a field in the main table than as an attribute in an attribute table for example. Further, a profiler of the present invention allows a user to model the length of attributes to see if they are an efficient length, as well as the efficiency of links in the data repository. Incorrectly stored hyperlinks can be major source of data repository performance problems if incorrectly formed and/or stored. Table 3 below lists some types of attribute quality checks that may be performed by one or more embodiments of the present invention.

Categories: Category checks may be performed on data repositories that have a hierarchy or taxonomy. Table 2, below, lists some types of category quality checks that may be performed by one or more embodiments of the present invention.

Evaluating the taxonomy of the repository identifies performance issues. For example, should a predefined text value be an attribute, or should it be a field in the main table? The consequences of an incorrect choice are that when a field in the main table is common across categories, that is, it is a category specific attribute; this will create numerous redundant an inefficient links in the underlying repository. For example, length might be a common attribute to all the products in a vendor repository, without regard to which category the products belong to. But if length is profiled as an attribute using the methods of the present invention, it will be identified as preferably a field in the main table that may be referenced across categories. This schema verification/taxonomy check will greatly improve the efficiency of the repository.

Generalized Hierarchy Statistics

Generalization hierarchy evaluation is performed by a grouping statistically entities that share common attributes. A hierarchy has two types of entities:

(1) Super-type is a generic parent entity that contains generalized attributes and key
(2) Subtypes are category entities that inherit the attributes keys and relationships of the super-type entity.

The following tables illustrate the types of statistical data that might be captured by a profiler that embodies one or more aspects of the present invention in order to provide users with an evaluation of the efficient of the data repository's generalized hierarchy, as well as the repository's categories and attributes.

TABLE 1

Exemplary generalization hierarchy statistical data collection for one or more embodiments of the present invention:

No. of Hierarchy Levels
No. of Child Nodes
Max. Attribute Links
Max. Text Attributes Values
Avg. no. of attributes per category
Avg. no. of child nodes

TABLE 2

Exemplary category statistical data collection for one or more embodiments of the present invention:

Category Name
Category Path
No. of Linked text attributes

TABLE 2-continued

Exemplary category statistical data collection for one or more embodiments of the present invention:

No. of Linked numeric attributes
Total no. of linked attributes
No. of assigned products

TABLE 3

Exemplary attributes statistical data collection for one or more embodiments of the present invention:

Attribute Name
Alias
Definition
Attribute Type
Default unit
Decimal places
Show fraction
Is Multi-value
No. of linked categories
No. of text values
Min. text value
Max. text value
No. of numeric values
Is linked
Used in Main
No. of linked products
No. of attribute values in main
Attribute Fill Rate
No. of distinct attribute values in main
Min. attribute values in main
Max. attribute values in main
Unused attribute text values Business Rule Verification Another option for verifying and validating a data repository and its associated data and metadata includes providing a layer for analysis of the business rules of the database. While business rule analysis is more particular to the implementation of the data repository itself, the techniques described herein, including running statistical queries to create a statistical profile that determines and evaluates the business rules, next the results of those queries are displayed, and to provide a higher level analysis of the issue related to the accuracy, validity and efficiency of those rules, is also in keeping with teachings of the present invention. When the business rules of the data repository can be examined in terms of their statistical parts, inefficiency that was previously hidden may become apparent. Evaluation of business rules is largely a quality analysis. Any tool to evaluate business rules should allow the user an entry point to add customized checks and rules for evaluating business rules validity, as rules can be highly particularized to the data repository in question, though the method of the present invention will apply to their evaluation nonetheless.

The present invention is not limited as to the type of computer on which it may be run. The computer typically includes at least a keyboard, a display device such as a monitor, and a pointing device such as a mouse. The computer also typically comprise a random access memory (RAM), a read only memory (ROM), a central processing unit (CPU) and a storage device such as a hard disk drive.

While the present invention herein disclosed has been described by means of specific embodiments and applications thereof, numerous modifications and variations could be made thereto by those skilled in the art without departing from the scope of the present invention set forth in the claims.

What is claimed is:

1. A method for metadata verification of a data repository of a computer system comprising:
   accessing a data repository comprising multiple layers through a data profiler program, wherein each layer comprises a collection of attributes and wherein said data profiler program is configured to statistically examine data in individual layers of said data repository;
   querying said data repository for metadata information about said data repository;
   statistically analyzing said metadata information for each of said multiple layers;
   presenting statistics regarding said metadata information using said data profiler program for each individual layer of said multiple layers;
   identify potential problems comprising invalid or inaccurate metadata information from said data repository; and
   presenting a report comprising said potential problems for inspection.

2. The method of claim 1 wherein said metadata information is data repository schema information.

3. The method of claim 2 wherein said analyzing step further comprises analyzing said schema information for field redundancy.

4. The method of claim 2 wherein said analyzing step further comprises analyzing said schema information for field dependency.

5. The method of claim 1 wherein said analyzing step further comprises analyzing said schema information for multi-value field analysis.

6. The method of claim 1 wherein said analyzing step further comprises analyzing said schema information for cardinality analysis.

7. The method of claim 1 wherein said metadata information is data repository taxonomy information.

8. The method of claim 7 wherein said analyzing step further comprises analyzing said taxonomy information for attribute issues.

9. The method of claim 7 wherein said analyzing step further comprises analyzing said taxonomy information for category issues.

10. The method of claim 1 wherein a result of said analyzing step is used to create an issue profile for said data repository.

11. A data profiler computer-readable medium encoded with computer-readable instructions for uncovering data quality issues of a data repository of a computer system, said computer-readable instructions configured to enable a computer system to:
    access a data repository comprising multiple layers, each layer comprising a collection of attributes;
    query said data repository for data quality information about said data repository; statistically analyze said metadata information to identify potential problems in said data repository, wherein said potential problems comprise at least one of potential invalid values and potential inaccurate values;
    generate a higher level profile report to determine data quality information; and
    present statistics regarding said data quality information in individual layers of said data repository.

12. The method of claim 11 wherein said statistically analyze step comprises a metaphone analysis of said data in said data repository.

13. The method of claim 11 wherein said statistically analyze step comprises a pattern analysis of said data in said data repository.

14. The method of claim 11 wherein said statistically analyze step comprises an analysis of the dependency between a plurality of fields of said data repository.

15. The method of claim 14 wherein said statistically analyze step further comprises identifying invalid data values using said dependency analysis.

16. The method of claim 11 further comprising:
    providing a repair function whereby a user can define a mask for repairing said suspect values in said data repository.

17. The method of claim 11 wherein the result of said analyzing step is used to create an issue profile for said data repository.

18. A method for analysis of a data repository hierarchy of a computer system comprising:
    accessing a data repository comprising multiple layers through a data profiler program, wherein each layer comprises a collection of attributes and wherein said data profiler program is configured to statistically examine data in individual layers of said data repository;
    profiling a generalized hierarchy of said data repository by computing generalized hierarchy statistics for entities of said data repository that share common attributes;
    analyzing said generalized hierarchy statistics to identify potential problems in said data repository hierarchy, wherein said potential problems comprise potentially invalid or inaccurate metadata information from said data repository; and
    presenting said potential problems in individual layers of said data repository for inspection using said data profiler program.

19. The method of claim 18 further comprising providing a repair function whereby a user can define a mask for repairing said potential problems in said data repository hierarchy.

20. The method of claim 18 wherein the result of said analyzing step is used to create an issue profile for said data repository hierarchy.

* * * * *